United States Patent

[11] 3,590,142

[72] Inventor Hans Keller
Molfsee, Germany
[21] Appl. No. 715,040
[22] Filed Mar. 21, 1968
[45] Patented June 29, 1971
[73] Assignee Dr.-Inq. Rudolf Hell
Kommanditgesellschaft
[32] Priority Mar. 22, 1967
[33] Germany
[31] H 62217 IXa/57d

[54] METHOD FOR ELECTRONIC CORRECTION OF COLORS
2 Claims, 5 Drawing Figs.

[52] U.S. Cl. .......... 178/5.2
[51] Int. Cl. .......... H04n 9/12
[50] Field of Search .......... 178/5.2 A, 6.7

[56] References Cited
UNITED STATES PATENTS

| | | | |
|---|---|---|---|
| 2,721,892 | 10/1951 | Yule | 178/5.2 A |
| 2,790,844 | 4/1957 | Neugebauer | 178/5.2 A |
| 2,981,792 | 4/1961 | Farber | 178/5.2 A |
| 3,124,036 | 3/1964 | Hell et al. | 178/6.7 |

*Primary Examiner*—Richard Murray
*Assistant Examiner*—Alfred H. Eddleman
*Attorney*—Hill, Sherman, Meroni, Gross & Simpson

ABSTRACT: A method of producing colored reproductions of colored originals, utilizing electronic color correction, in which a secondary correction signal which disappears for gray tones is formed from the uncorrected color separation signals and another signal of the same gray contrast containing color correction information, by formation of the difference, in which the primary color separation signals concerned, proportional to the transparency, are transformed according to a nonlinear function which is a monotonic intermediate function between a linear and a logarithmic function, and the course of which in the region between 100 percent and 1 percent of the white signal value is represented by a power function $y=x^a$ in which $0.3 \leqq a \leqq 0.6$. Preferably a Munsell function.

INVENTOR
HANS KELLER

BY Hill, Sherman, Meroni, Gross & Simpson
ATTORNEYS

INVENTOR
HANS KELLER

BY Hill, Sherman, Meroni, Gross & Simpson
ATTORNEYS

INVENTOR.
Hans Keller

BY Hill, Sherman, Meroni, Gross & Simpson ATTORNEYS

METHOD FOR ELECTRONIC CORRECTION OF COLORS

BACKGROUND OF THE INVENTION

The present invention is directed to a method of electronic color correction, in which a secondary correction signal, which disappears for gray tones, is formed from the uncorrected color separation signal and another signal, of the same gray contrast, containing color correction information, by forming the difference.

Carrying out an electronic color correction refers to the determination of a trio of color dosage signals for each trio of color separation signals, obtained by photoelectrically scanning the colored original picture to be reproduced. This corresponds mathematically to a topological deformation of an irregular rhomboidal hexahedron into a cube. To this end, a system of linear equations has been established at different times as a basis for calculation, which permits a linear area transformation which may be utilized as a first approximation (See U.S. Pat. No. 2,721,892). Since the coordinates of the color area involved are density values, the primary color separation signal values proportional to the transparency were, as a rule, submitted to a logarithmic compression in order to be able to calculate with additions and subtractions which are much easier than multiplications and divisions. A method heretofore proposed, which is preferred at present, utilizes a secondary signal carrying correction information obtained by difference formation from a separation signal, in logarithmic form, and another logarithmic primary signal serving for correction, which secondary signal no longer contains gray information, but only color information, which consequently disappears for all gray values. This operation is sometimes referred to as compensatory masking.

Utilization of color correction apparatus constructed according to this principle revealed that the quality of correction still was not entirely satisfactory. The reason for this is due to the fact that in the uncorrected rhombic color area, the opposite basic surfaces are not parallel to one another, and that in addition these surfaces actually are noticeably curved.

Subsequent improvements employed to counteract these conditions are illustrated in patents whose common feature is that the difference signal, containing no gray information, is distorted nonlinearly (see British Pat. No. 855,895 corresponding to German specification No. 1,135,295), or is bent at the zero point (see British Pat. No. 1,057,370 and German Patent application H 56646 IXa/57d), prior to its addition as a correcting signal to the uncorrected signal. This method enables those defects in correction which arise from the lack of parallelism of the rhomboid surfaces, to be largely removed.

This is schematically illustrated in FIG. 1 of the accompanying drawings, in which the logarithmic uncorrected color separation signal is shown as the ordinate and a suitable signal of the same gray contrast containing correction information is shown as the abscissa, W and S being the loci of white and black respectively with the gray line connecting them. A and K are the loci of a separation color and its complementary color. In order to lower the ordinate of A to the black value, a correcting signal of greater value must be subtracted from the ordinate of A than that which is to be added to the ordinate of K, in order to reach the white level of W. If the difference signal value is formed from both coordinate signal values, it is proportional to the distance between the gray line and the color locus, there being a change in the + or − sign when crossing the gray line. As may be seen from FIG. 1, point A produces a difference signal which is smaller in magnitude than K, but the position of A is to be more strongly corrected. In order to achieve this result, the positive difference signals must be reduced as against the negative difference signals. This alteration of the difference signal is the common feature of the above-mentioned known methods. The geometrical locus of like difference signals in FIG. 1 is a family of straight lines extending parallel to the gray line, and the alteration of these difference signals produces only parallel shifts.

Since the uncorrected color area is defined, as a first approximation, only by straight lines and planes, whereas in actual fact it has convex curves, it often resulted, when this process was applied, that the correction in the dark color tones was too strong and produced undesired effects. Thus, the black of the colored picture original to be reproduced was mostly color overcast. While such a color overcast may often be neutralized by asymmetrical black control with the aid of black regulators, this results in simultaneously processed, neutral control gray wedges located symmetrically in the color space, exhibiting, due to the correction, a considerable undesired change in contrast, which destroys the monotonic gray value sequence and leads in the wedges to the occurrence of negative contrast sections within the positive contrast sections. The same applies to a greater extent to the case where the colors of two or more than two picture originals are to be simultaneously corrected, which originals exhibit different color overcast in the deep dark parts. Another, more technical defect is that the logarithmic transformation of the signals, as a rule, is again subject to partial cancellation during following contrast influencings, thus reducing the accuracy of calculation.

Finally, it is to be emphasized as being disadvantageous, above all in the case of cyan separation, that the sharp asymmetry indicated in FIG. 1 of the color rhombus requires such a small color correction in the white colors and such a strong correction in the black colors.

It is an object of the invention to remove or minimize these defects to a sufficient degree and in a simple manner.

SUMMARY OF INVENTION

According to the invention, the desired objectives are achieved by the primary color separation signals involved, which are proportional to the transparency, by transformation thereof according to a nonlinear function prior to the formation of the difference, which function is a monotonic intermediate function between a linear and a logarithmic function, and the course of which in the region between 100 percent and 1 percent of the white value signal is represented by a power function $y=x^{\alpha}$ with $0.3 \leqq \alpha \leqq 0.6$. It probably is not by mere chance that the function of like physiological differences of perception found by Munsell is such a function. The difference signal may then be formed in accordance with the known procedures.

DESCRIPTION OF THE DRAWINGS

In the drawings:

FIGS. 4 and 4*a* illustrate, in block form, the general type of circuit involved, with the addition of respective nonlog transformation stages.

DETAILED DESCRIPTION

In connection with the following description, as well as in the prior publications, with reference to logarithmic transformation of the input signal, it should be noted that this does not refer to the function $y=\log x$ which, for values of $x \to 0$, moves towards $-\infty$, but a function of the form:

$$v=c_1 \frac{\log x-\log x_1}{\log x_2-\log x_1}+c_2 \quad x_1 \leqq x \leqq x_2$$

in which $x_2$ is the highest, and $x_1$ the lowest value of the input signal $x$, and $c_2$ represents a primarily unimportant but unavoidable residual voltage which is as small as possible, amounting to a few percent of the maximum value of the fraction.

Figure 3:
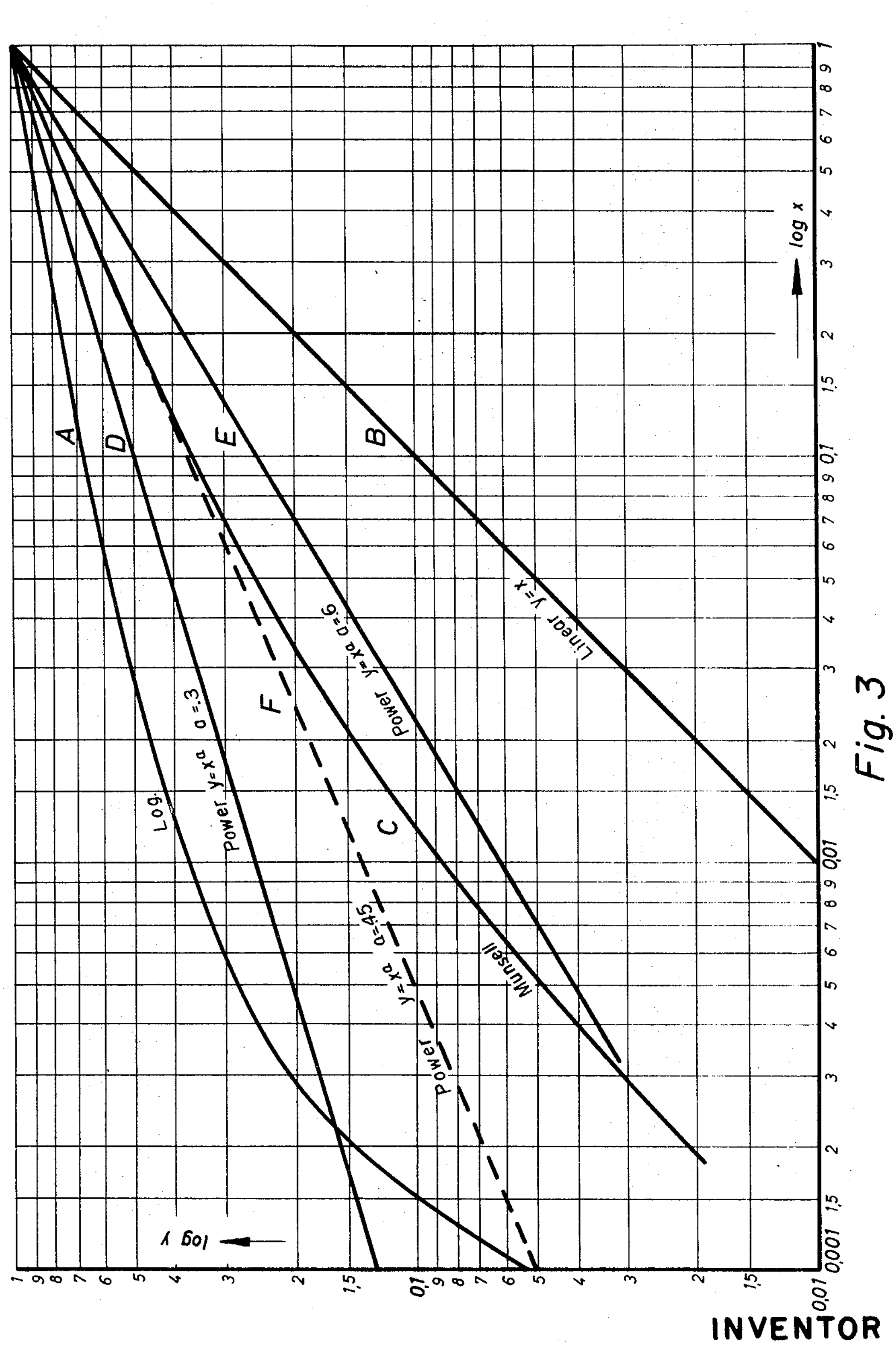
FIG. 3 is a chart illustrating functions $y=f(x)$, with logarithmic scales on both axes, in which the maximum amount of the white value is standardized at 1.

Referring to FIG. 3, illustrating functions $y=f(x)$, the function A represents a logarithmic function, while the function B($y=x$) is a linear function. The function C is a Munsell function, which allocates to the input signal a series of constant physiological brightness differences. The functions D and E are power functions $y=x^a$ with the powers $a=0.3$ and $a=0.6$ respectively, while the function F is a power function with the power $a=0.45$.

After a signal transformation according to the invention, the difference is formed from the uncorrected color separation signal and the signal containing the correction information. This difference also disappears for gray signals and, for the purpose of correction, is added to the transformed uncorrected separation signal, if necessary, after a previous modification of the contrast of the difference signal.

Figure 1:
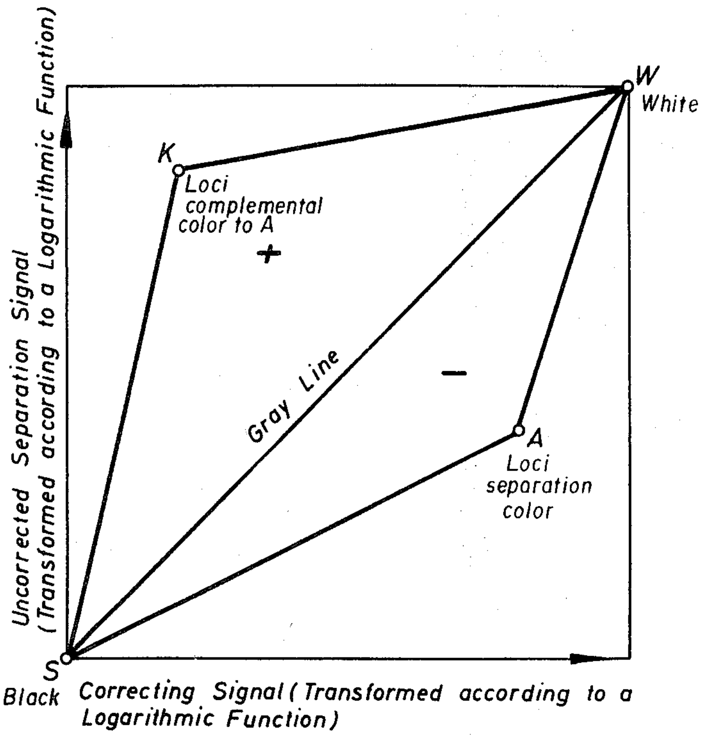
FIG. 1 is a graph illustrating the relationship of correcting and uncorrected signals (transformed according to a logarithmic function)
Figure 2:
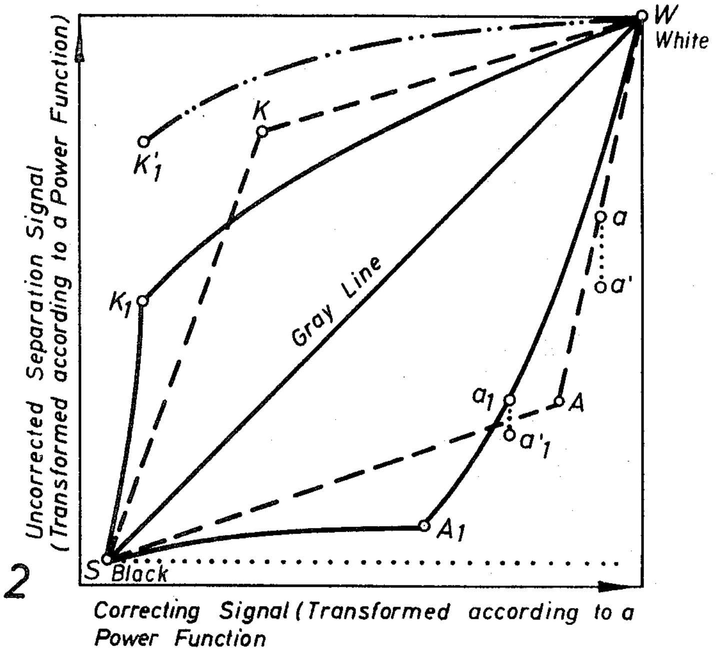
FIG. 2 is a similar graph illustrating the corresponding relationship of correcting and uncorrected signals (transformed according to a power function.

FIG. 2 of the accompanying drawings explains the effect of this method. The ordinate and abscissa represent the signal magnitudes existing after the input signals have been transformed according to the invention. For a color area defined by planes, a logarithmic transformation was assumed in FIG. 1. The color area thereby produced is rhombic in projection and is illustrated in FIG. 2 by the quadrangle W, K, S, A, in dash lines. If transformation is not effected logarithmically, but for example, by the power function $y=x^{0.45}$ corresponding to the invention (see FIG. 3, curve F), the solid quadrangle W, $K_1$, S, $A_1$, having curved lines is produced as illustrated in FIG. 2. If one assumes that for both quadrangles the difference is formed in each case from the signals and the difference signal added to the uncorrected signal, the following comparison of the results can be made: A and $A_1$, as well as K and $K_1$ are spaced substantially equidistant from the gray line. Consequently, the correcting difference signal has about the same magnitude in both cases. $K_1$, however, is twice as far from the horizontal upper white level line as K. Therefore a comparatively stronger correction is required. Conversely, $A_1$ is much closer than A to the horizontal black level line, shown in dotted form, and drawn through the black point S. Therefore a much weaker correction is required for $A_1$. This effect compensates asymmetries of the form illustrated in FIG. 1.

Further, considering lines K–W and $K_1$–W (the white color lines) and assuming that both are corrected to the same degree with the difference signal, which is rendered so large that K reaches the white level horizontal line, the whole white line K–W will then coincide therewith. The same intensity of correction, applied to the line $K_1$–W, only brings this line to coincidence with the horizontal line in the region of the white. When further away, it falls (shown in broken lines) as far as point $K_1$ whereby the correction thereat is weaker, namely as the transition is made to dark colors. This corresponds to the original objective. The effect is similar on the black color side. A and $A_1$ are brought by the correction to the horizontal black level line passing through S. To this end, more signal intensity is necessary for A and less for $A_1$. Now considering the effect on a color point $a$ lying on the center of line A–W, it will be noted that it is corrected by half the amount in comparison with A to $a'$. The same color point initially at $a_1$, due to the nonlogarithmic transformation, is brought to $a'_1$ by the slight correction. The correction between $A_1$ and $a_1$ is therefore no longer materially modified. Also the concave curve of the lines $K_1S$ and $A_1S$ takes effect in the form of a more strongly decreasing correction towards black, in contrast to the logarithmic transformation.

Complete circuitry has not been illustrated herein as known electrical circuits may be employed for each step of the method, merely selecting values of components, in accordance with known techniques, to provide the desired functional values. For example, considering the circuits of Yule U.S. Pat. No. 2,721,892, previously referred to, a circuit for use with the present invention could employ suitable logarithmic amplifiers comparable to the amplifiers 72,73 and 172,173 of Yule, from which the respective log signals may be conducted to respective multipliers, each comparable to the modulators 82 and 182 of Yule whereby the log signal may be exponentially raised in accordance with the power function $y=x^a$. Following these operations the respective signals may be conducted to a modulator comparable to the modulators 78 and 178 of Yule, in which the desired difference signal may be formed. The resulting correction signal, together with the uncorrected signal involved, may then be conducted to another modulator comparable to the modulators 84 and 184 of Yule, with the output therefrom constituting the corrected signal. Obviously, however, any suitable known computer circuitry capable of performing the desired mathematical functions may be utilized in the practice of the invention.

Figure 4:
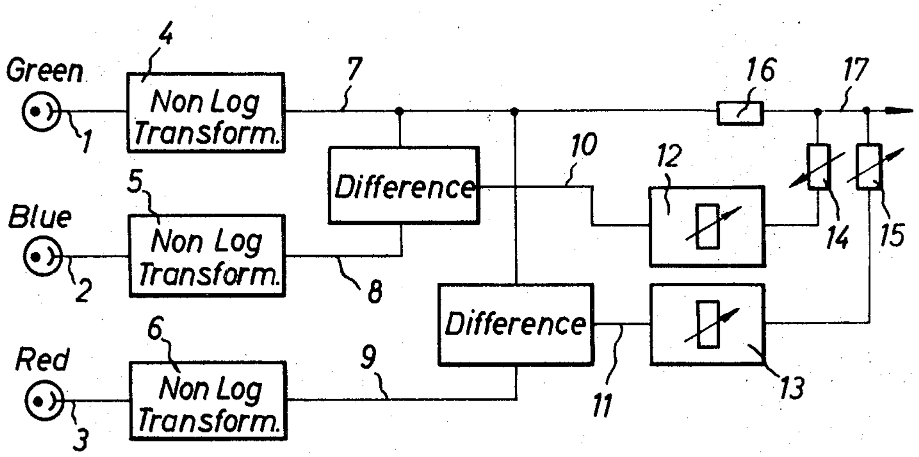
Figure 5:
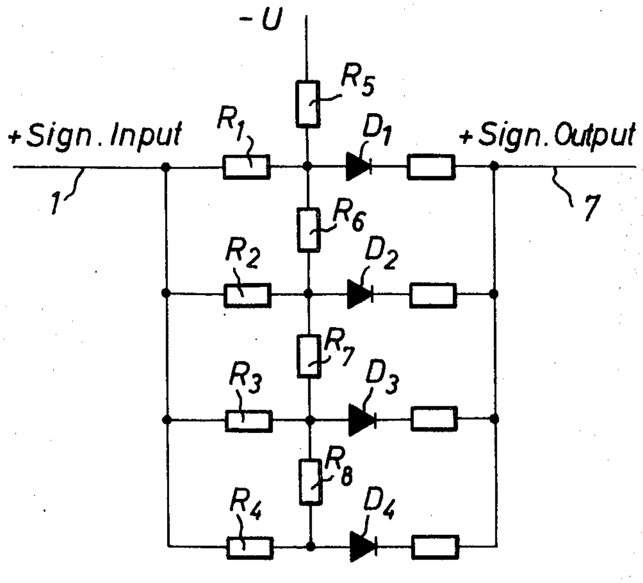
FIG. 5 illustrates an example of a known resistance-diode network utilizable in the practice of the invention.

For example, FIG. 4 illustrates, in block form, a suitable circuit provided with transformation stages in accordance with the invention, for correction of a single color, for example, green. As in prior arrangements the respective colors, after passage through corresponding filters, not shown, are transformed into electrical color separation signals by means of photocells or the like. Such signals are proportional to the respective sensed light and may be standardized on one and the same white signal standard in accordance with known techniques. Such signals are conducted over liens 1, 2 and 3 to respective nonlog transformation stages 4, 5 and 6, in which, in accordance with the invention, a nonlogarithmic transformation is effected.

The outputs of the stages 4 and 5 are connected over the respective conductors 7 and 8 to a difference circuit and in like manner the outputs of the stages 4 and 6 are connected over the respective conductors 7 and 9 to a like difference circuit. The respective outputs of the difference circuits are connected over respective conductors 10 and 11 to further evaluation stages 12 and 13 and the output therefrom conducted over adjustable resistances 14 and 15 respectively to the output 17, which is also connected to the conductor 7 over a resistance 16, whereby the corrected composite signal for the color green appears at the output 17.

The corrected signals for the other colors may be obtained in like manner, for example merely cyclically interchanging the colors at the respective input lines 1, 2 and 3, or by duplication of the circuitry.

It will be appreciated that the above circuit, subsequent to the transformation stages 4, 5 and 6, is of known construction, as for example, such as illustrated in British Pat. No. 1,057,370.

FIG. 4*a* illustrates a known type of resistance-diode network for obtaining a nonlogarithmic function, and which could be employed in the practice of the invention by suitable insertion into the circuits, as for example, by insertion between respective pairs of lines, 1–7, 2–8 and 3–9. In this arrangement the output characteristic curve comprises the composite of the characteristic curves of the individual diodes $D_1$ to $D_4$, as determined by the resistances $R_1$—$R_8$, which form respective voltage dividers connected to the potential $U_1$, and the breakdown voltages of the diodes, thus producing a nonlogarithmic curve.

Changes may be made within the scope and spirit of the appended claims which define what is believed to be new and desired to have protected by Letters Patent.

I claim:

1. A method of producing colored reproductions of colored originals, utilizing electronic color correction, in which a secondary correction signal, which disappears for gray tones, is formed from the uncorrected color separation and another signal of the same gray contrast containing color correction information, by forming the difference, comprising the step of transforming the primary color separation signals concerned, which are proportional to the transparency, according to a nonlinear function which is a monotonic intermediate function between a linear and a logarithmic function, and the course of which in the region between 100 percent and 1 percent of the white signal value is represented by a power function $y=x^a$ with $0.3 \leq a \leq 0.6$, and thereafter forming such difference signal from the transformed separation signals involved.

2. A method according to claim 1, wherein the function according to which the color separation signals are transformed, is a Munsell function (function or like physiological differences of perception).